United States Patent [19]

Bunkofske

[11] Patent Number: 4,632,157

[45] Date of Patent: Dec. 30, 1986

[54] AIR COMPRESSOR OPERATED VACUUM SYSTEM FOR TIRE SERVICING VEHICLES

[75] Inventor: William J. Bunkofske, Ankeny, Iowa

[73] Assignee: Iowa Mold Tooling Company, Inc., Garner, Iowa

[21] Appl. No.: 745,292

[22] Filed: Jun. 14, 1985

[51] Int. Cl.$^4$ ............................................. B65B 3/04
[52] U.S. Cl. ........................................ 141/38; 141/98; 141/65; 141/67; 141/231; 180/53.1; 180/53.8; 417/149; 417/234; 417/364; 222/608
[58] Field of Search ............................ 180/53.1, 53.8; 417/149, 364, 234; 141/65, 66, 67, 231, 232, 233, 98; 222/608

[56] References Cited

U.S. PATENT DOCUMENTS 4,057,364 11/1977 Bratschitsch ...................... 417/149

Primary Examiner—Houston S. Bell, Jr.
Attorney, Agent, or Firm—Wood, Dalton, Phillips, Mason & Rowe

[57] ABSTRACT

A service truck for servicing tires on off the road vehicles such as agricultural tractors includes an engine and an air compressor selectively operable by the engine. The vehicle includes a liquid tank for receiving and temporarily holding a liquid removed from such tires. A vacuum may be applied to the interior of the tires being serviced to withdraw the liquid for placement in the tanks by taking advantage of the vacuum present at the inlet of the compressor.

3 Claims, 2 Drawing Figures

AIR COMPRESSOR OPERATED VACUUM SYSTEM FOR TIRE SERVICING VEHICLES

DESCRIPTION

FIELD OF THE INVENTION

This invention relates to tire servicing vehicles, and more specifically, to the provision on said vehicles of a vacuum system operated by an air compressor to enable liquids to be withdrawn from tires to be serviced.

BACKGROUND OF THE INVENTION

Agricultural vehicles as, for example, tractors employ extremely large tires as is well known. Because of the size of the tires, when servicing of the same is required, they are serviced on site since they cannot be easily transported to a remote servicing site.

Such on-site servicing is frequently accomplished with the use of a tire servicing vehicle such as a truck specially outfitted for tire servicing operations at remote locations.

In the usual case, the truck will be provided with a compressor, frequently mounted under the hood, to be driven by a selectively operated clutch by the vehicle engine. A compressed air tank will also be carried by the vehicle and is operatively associated with the compressor so as to provide a large volume source for compressed air that may be needed during the servicing operation.

It is very common to place a substantial volume of a liquid, typically a calcium chloride solution, in the tires of agricultural vehicles such as tractors. This volume of liquid adds considerably to the weight of the vehicle thereby improving its traction as such a vehicle moves through fields pulling implements or the like. In a tire servicing operation, it is necessary that such liquid be removed from the tire before servicing can be performed. Because the liquid frequently is of a large volume, and even more frequently will be a water based solution of some salt to prevent the same from freezing, it is desirable to save the solution for reuse by replacement within the tire after the same has been serviced.

Thus, conventional servicing trucks are provided with relatively large tanks for receiving the liquid and holding the same during the course of a servicing operation so that it may be subsequently replaced in the tire.

In order to remove the liquid from a tire, probes that may be placed in fluid communication with the interior of the tire via a valve stem or the like are used to interconnect the tire and the tank. A vacuum is drawn on the system to withdraw the liquid. In conventional servicing trucks, a vacuum for the purpose is obtained from the intake manifold of the spark ignition engine used to propel the servicing truck. This method, while working relatively well for its intended purpose, has a sizable drawback for as the system ages, sticky valves or other difficulties may result in the solution within the tire being actually drawn into the intake manifold of the engine and into the combustion chambers themselves. Such can cause severe corrosion and render the engine useless.

Moreover, this method cannot be employed in tire servicing trucks that are powered by diesel engines by reason of insufficient vacuum being present at the intake manifold.

The present invention is directed to overcoming one or more of the above problems.

SUMMARY OF THE INVENTION

It is the principal object of the invention to provide a new and improved service truck for servicing tires. More specifically, it is an object of the invention to provide a new and improved tire evacuating system utilizing the application of a partial vacuum to a system connected to the interior of a tire containing liquid that avoids the possibility of damage to the engine of the vehicle and which may be employed in vehicles having diesel engines without the addition of a vacuum source.

An exemplary embodiment of the invention achieves the foregoing object in a service truck including the body having ground engaging wheels. An engine is disposed in the body for providing propelling power to the truck and an air compressor is disposed on the body and has an inlet and an outlet. The air compressor can be selectively coupled to the engine to be driven thereby. A compressed air tank is disposed on the body and is connected to the outlet of the air compressor and at least one liquid tank is located on the body and is adapted to receive tire liquid. A fluid line is included and is adapted to be placed in communication with the interior of a tire to be serviced. Valve means are provided for selectively connecting the fluid line to the liquid tank. A three way valve is connected to the inlet of the air compressor for alternatively (a) establishing fluid communication between the air compressor inlet and the ambient and (b) establishing fluid communication between the liquid tank and the air compressor inlet. Means are provided for selectively operating the three way valve.

As a consequence, when the valve is operated to connect the inlet to the atmosphere, the compressor may be utilized to provide compressed air to the tank. Conversely, when the inlet of the air compressor is connected to the tank, the compressor may be operated to draw a vacuum on the tank and to evacuate a tire to which the system may be coupled.

The invention, by not connecting parts of the system receiving liquid to the engine intake manifold, avoids the possibility of damage to the engine. It also may be used advantageously in tire servicing vehicles powered by diesel engines since a vacuum created by the engine during operation is not necessary. Furthermore, the system takes advantage of components already found on a tire servicing vehicle, namely the air compressor, to provide a vacuum source in a most economic fashion.

In a preferred embodiment, the three way valve is an air operated piloted valve and is normally connected so as to establish fluid communication between the inlet and the ambient for air compression purposes. Upon receipt of a pilot signal, the pilot operated three way valve establishes fluid communication between the liquid tank and the air compressor inlet. A pilot valve is utilized and is operable to provide the pilot signal by interconnecting the air tank and the pilot on the three way valve.

A highly preferred embodiment contemplates the use of a manually operable three way pilot valve to provide the pilot signal or to remove the pilot signal by establishing fluid communication between the pilot and the ambient.

Other objects and advantages will become apparent from the following specification taken in connection with the accompanying drawings.

DESCRIPTION OF THE PREFERRED EMBODIMENT

Figure 1:
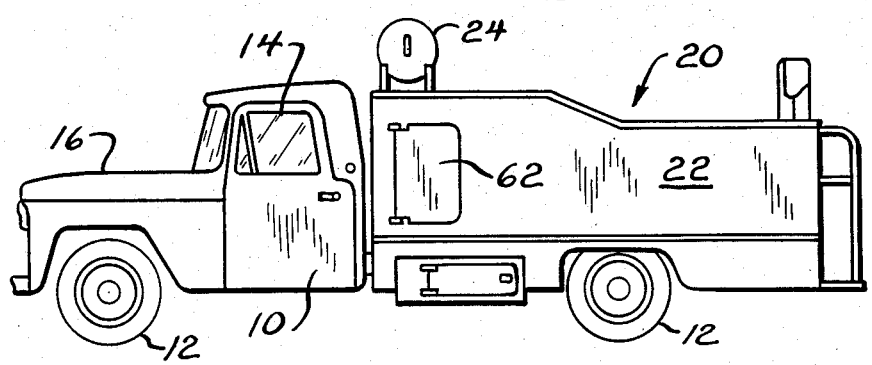
FIG. 1 is a side elevation of a tire servicing vehicle made according to the invention.

An exemplary embodiment of a tire servicing vehicle made according to the invention is illustrated in FIG. 1 and is seen to include a truck body 10 having ground engaging wheels 12. The truck 10 includes a cab 14 for the driver and forwardly thereof is a hood 16 which typically will house an engine 18 (shown schematically in FIG. 2). The engine 18 conventionally provides power for propelling the truck 10.

Rearwardly of the cab 14 is a bed, generally designated 20, which may be provided with sides 22 and other equipment conventionally associated with tire servicing trucks as, for example, a compressed air tank 24.

Figure 2:
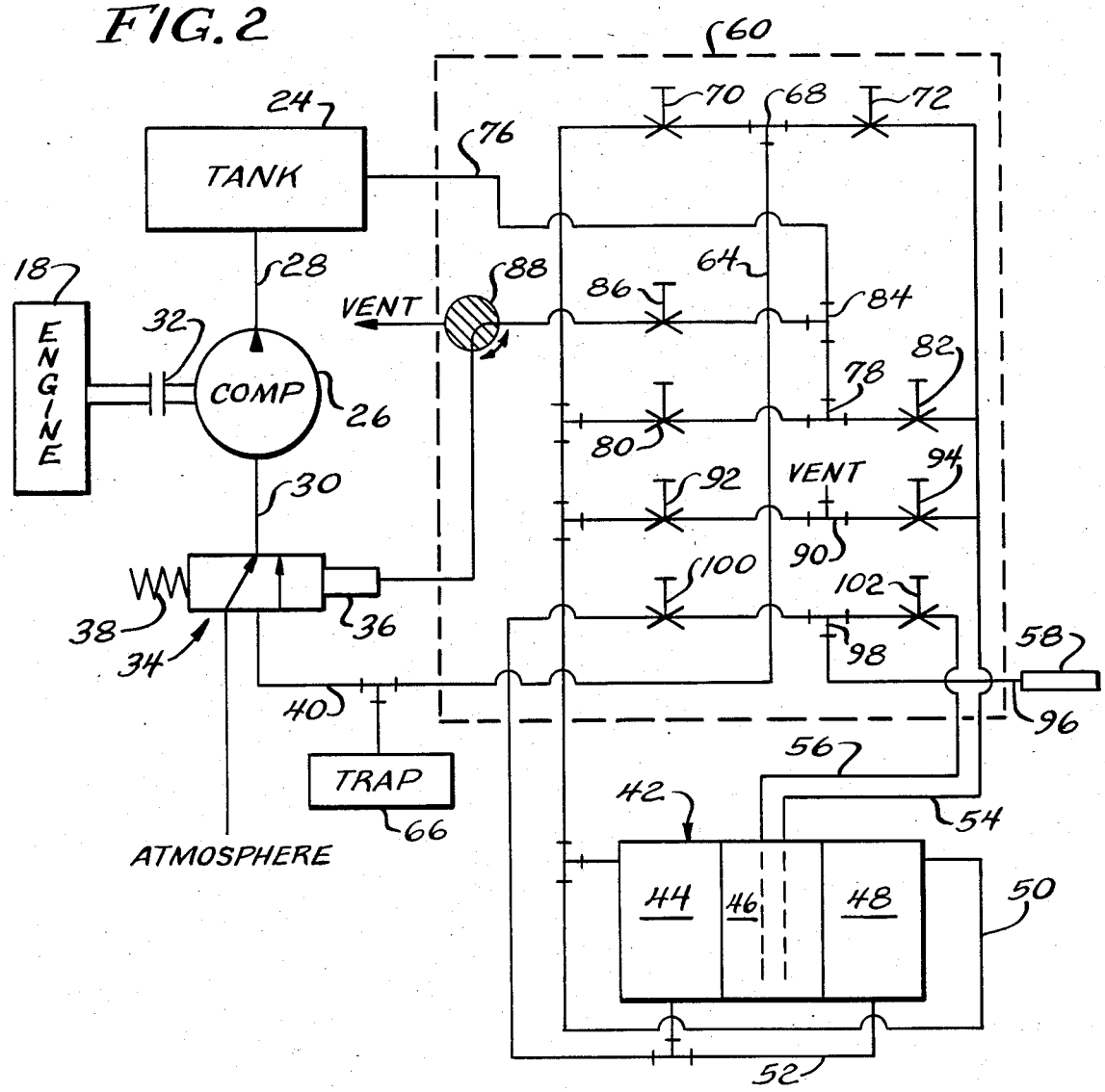
FIG. 2 is a schematic illustrating the evacuating system of the present invention.

Turning to FIG. 2, the truck mounts, typically under the hood 16, an air compressor 26 of known sort having an outlet 28 and an inlet 30. By means of a selectively operable clutch 32, frequently an electro-magnetic clutch, the compressor 26 may be coupled to the engine 18 to be driven thereby.

The outlet of the compressor 26 is connected to the tank 24 while the inlet is connnected to a pilot operated three way valve, generally designated 34. The valve 34 includes an air operated pilot 36 for receiving a pressurized pilot signal. When the pilot 36 is not pressurized, the valve will be in the configuration illustrated in FIG. 2 and will establish fluid communication between the inlet 30 and the ambient or atmosphere. Conversely, when the pilot 36 receives a pilot signal, the valve will be shifted against the bias of a spring 38 to connect the inlet 30 to a line 40 for purposes to be seen.

Mounted at an appropriate location on the truck bed 20, as for example under the compressed air tank 24, is a liquid tank, generally designated 42 capable of holding several hundred gallons of liquid. In a preferred embodiment, the tank 42 is divided into three isolated compartments, 44, 46 and 48, the compartments 44 and 48 flanking the compartment 46. By means of a line 50 interconnecting compartments 44 and 48 near their tops, fluid, usually air, may be introduced or extracted from the compartments 44 and 48. A line 52 interconnects the bottoms of the compartments 44 and 48 for the purpose of introducing or withdrawing liquid of the type replaced in tires as alluded to previously.

The central compartment 46 includes a line 54 to its top for the introduction or removal of air and a line 56 extending to its bottom for the introduction or removal of liquid.

The compartments 44 and 48 are connected in common so as to fill or empty simultaneously and provide equal loading of the body 10 from the one side to the other when the capacity of the compartment 46 is insufficient to accommodate all of the liquid being handled.

The system includes a conventional probe 58 which may be connected to the interior of a tire for introducing or removing liquid therefrom. An air chuck may also be employed in lieu of the probe 58 for directing compressed air into the tire.

Mounted on the body 10 is a panel shown schematically at 60 which may be protected, for example, by a door 62 hinged to one of the sides 22 of the bed 20. Within the panel 60 is a series of valves and fluid conduits which will now be described. A first conduit is a vacuum line 64 connected to the line 40 with an intermediate trap 66 to capture any liquid such as liquid from a tire or condensate before it can travel to the line 40 and thus to the valve 34 and the compressor inlet 30.

The vacuum line 64 extends to a tee 68 and branches to a first valve 70 and a second valve 72 which may be manually operated. The valve 70 is connected to the line 50 and thus, when opened, will apply a vacuum to the compartments 44 and 48 assuming the valve 34 has shifted in response to receipt of a pilot signal. The vacuum will, of course, be created by operation of the compressor at its inlet 30.

The valve 72 may be operated to apply the vacuum via the line 54 to the compartment 46.

The tank 24 is connected via a line 76 to a tee 78. The tee branches the line 76 to valves 80 and 82 which connect respectively to the lines 50 and 54. Thus, when the valve 80 is opened, compressed air from the tank 24 may be directed to the tops of the compartments 44 and 48 to expel any fluid contained therein. Conversely, when the valve 82 is opened, compressed air will be directed via the line 54 to the compartment 46 to accomplish the same thing.

Just upstream of the tee 78 is a tee 84 extending to a valve 86 which in turn is connected to a manually operable three way valve 88. Assuming the valve 86 is open, and a three way valve 88 is in the position illustrated in FIG. 2, air under pressure from the tank 24 will be communicated to the pilot 36 to shift the three way valve 34 from the position illustrated. When the three way valve 88 is shifted to its other position, it will establish fluid communication between the pilot 36 and the ambient, that is, it will vent the pilot 36 to allow the valve 34 to return to the position illustrated in FIG. 2.

The system also includes a tee 90 having one branch connected to atmosphere or vent and the other two branches connected via valves 92 and 94 respectively to the lines 50 and 54. By opening one or the other or both of the valves 92 and 94, various ones of the compartments 44, 46 and 48 may be vented to bleed off any pressure remaining from compressed air therein or to allow them to come up to atmospheric pressure.

The probe 58 is connected via a fluid line 96 to a tee 98 in the system. One branch of the tee 98 extends via a valve 100 to the line 52 while the other branch of the tee 98 extends via a valve 102 to the line 56. Consequently, by opening the valve 100, the probe 58 is placed in fluid communication with the compartments 44 and 48 while opening of the valve 102 will place the probe 58 in fluid communication with the compartment 46. As a consequence, depending upon which of the other valves 70, 72, 80 or 82 are opened, the probe 58 will be placed in fluid communication with the compressed air tank 24 or with the inlet 30 of the compressor 26. Thus, pressurized fluid may be applied to the probe 28 or a vacuum applied thereto for the purpose of withdrawing liquid from a tire prior to servicing of the same. In the case of the latter, the withdrawn liquid will be delivered to the compartments 44 and 48 if the valve 100 is opened and the valve 102 closed; to the compartment 46 if the valve 100 is closed and the valve 102 open; or to all three compartments if both valves are open.

From the foregoing, it will be appreciated that an evacuating system made according to the invention eliminates the difficulties found in prior art constructions in that there is no danger to the engine in terms of being contaminated with a liquid withdrawn from a tire. Furthermore, unlike prior art systems which cannot be utilized where the engine is a diesel engine, the inventive system can be used with either a spark ignition engine or a diesel engine.

Finally, it should be appreciated that the inventive system achieves the above stated benefit without adding complexity or the expense of providing a separate vacuum source in that it utilizes existing components already necessarily present on conventional tire servicing vehicles by making use of the vacuum present at the inlet 30 of the compressor 26.

I claim:

1. A service truck for servicing tires on off-the-road vehicles such as tractors or the like comprising:
   a body having ground engaging wheels;
   an engine on said body for providing propelling power for said truck;
   an air compressor on said body and having an inlet and an outlet and being selectively drivable by said engine;
   a compressed air tank on said body and connected to said outlet;
   at least one liquid tank on said body adapted to receive tire liquid;
   a fluid line adapted to be placed in communication with the interior of a tire to be serviced;
   valve means for selectively connecting said fluid line to said liquid tank;
   a three way valve having an air operated pilot and connected to said inlet and normally establishing fluid communication between said inlet and the ambient and operable upon receipt of a pilot signal to establish fluid communication between said liquid tank and said inlet; and
   a pilot valve operable to provide said pilot signal by interconnecting said air tank and said pilot.

2. A service truck for servicing tires on off-the-road vehicles such as tractors or the like comprising:
   a body having ground engaging wheels;
   an engine on said body for providing propelling power for said truck;
   an air compressor on said body and having an inlet and an outlet and being selectively drivable by said engine;
   a compressed air tank on said body and connected to said outlet;
   at least one liquid tank on said body adapted to receive tire liquid;
   a fluid line adapted to be placed in communication with the interior of a tire to be serviced;
   first valve means for selectively connecting said fluid line to said liquid tank;
   a three way valve connected to said inlet for alternatively (a) establishing fluid communication between said inlet and the ambient and (b) establishing fluid communication between said liquid tank and said inlet;
   means for selectively operating said three way valve; and
   second valve means for selectively connecting said compressed air tank to said liquid tank to expel liquid therefrom through said fluid line.

3. A service truck for servicing tires on off-the-road vehicles such as tractors or the like comprising:
   a body having ground engaging wheels;
   an engine on said body for providing propelling power for said truck;
   an air compressor on said body and having an inlet and an outlet and being selectively drivable by said engine;
   a compressed air tank on said body and connected to said outlet;
   at least one liquid tank on said body adapted to receive tire liquid;
   a fluid line adapted to be placed in communication with the interior of a tire to be serviced;
   valve means for selectively connecting said fluid line to said liquid tank;
   a three way valve having an air operated pilot and connected to said inlet and normally establishing fluid communication between said inlet and the ambient and operable upon receipt of a pilot signal to establish fluid communication between said liquid tank and said inlet; and
   a manually operable three way pilot valve operable to (a) provide said pilot signal by interconnecting said air tank and said pilot or (b) remove said pilot signal by establishing fluid communication between said pilot and the ambient.

* * * * *